(12) United States Patent
Viger et al.

(10) Patent No.: US 7,845,000 B2
(45) Date of Patent: Nov. 30, 2010

(54) METHOD AND DEVICE FOR CONTROLLING ACCESS TO A DIGITAL DOCUMENT SHARED IN A COMMUNICATION NETWORK OF THE STATION-TO-STATION TYPE

(75) Inventors: Pascal Viger, Coesmes (FR); Frederic Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1452 days.

(21) Appl. No.: 11/104,603

(22) Filed: Apr. 13, 2005

(65) Prior Publication Data

US 2005/0228753 A1    Oct. 13, 2005

(30) Foreign Application Priority Data

Apr. 13, 2004    (FR)    ................... 04 03840

(51) Int. Cl.
  *G06F 7/04*    (2006.01)
(52) U.S. Cl. ........................................................ 726/3
(58) Field of Classification Search ........................ None
  See application file for complete search history.

(56) References Cited

U.S. PATENT DOCUMENTS

| | | | | |
|---|---|---|---|---|
| 2002/0188735 | A1* | 12/2002 | Needham et al. | ............. 709/229 |
| 2004/0034601 | A1* | 2/2004 | Kreuzer | ........................ 705/52 |
| 2004/0184478 | A1 | 9/2004 | Donescu et al. | ............. 370/462 |
| 2005/0027995 | A1* | 2/2005 | Menschik et al. | ........... 713/193 |
| 2005/0044146 | A1 | 2/2005 | Nassor et al. | ................ 709/205 |
| 2005/0044483 | A1 | 2/2005 | Maze et al. | ............... 715/501.1 |
| 2005/0198118 | A1 | 9/2005 | Viger et al. | .................. 709/203 |
| 2005/0278389 | A1 | 12/2005 | Maze et al. | ................. 707/200 |

FOREIGN PATENT DOCUMENTS

| | | |
|---|---|---|
| EP | 1 150 198 | 10/2001 |
| WO | WO 00/58859 | 10/2000 |
| WO | WO 02/058453 | 8/2002 |

OTHER PUBLICATIONS

J. R. Yoon, "Digital multimedia contents marketplace based on p2p network", Apr. 3, 2003.

* cited by examiner

*Primary Examiner*—Brandon S Hoffman
(74) *Attorney, Agent, or Firm*—Fitzpatrick, Cella, Harper & Scinto

(57) ABSTRACT

The invention relates to a central server stations controlling access to a collection of digital data created by a client station. The server station receives, from the client station, a request to validate a collection of digital data, where the request contains the collection which has a collection identifier and for each data item belonging to the collection, a data identifier designating said data item, and at least one representation of said data item, the representation being chosen depending on said data item and on the collection identifier. For each data identifier received, a representation of the data item is locally obtained depending on the data item and on the collection identifier of the received collection associated with the collection. A comparison is made between the received representation and the obtained local representation and, in a case where the comparison results in a match, the digital data item to be shared is validated.

14 Claims, 11 Drawing Sheets

METHOD AND DEVICE FOR CONTROLLING ACCESS TO A DIGITAL DOCUMENT SHARED IN A COMMUNICATION NETWORK OF THE STATION-TO-STATION TYPE

BACKGROUND OF THE INVENTION

The present invention relates to the control of access to a shared document in a communication network of the "station-to-station" or distributed type, commonly referred to as the "peer-to-peer" topology type.

During the past few years, station-to-station networks have become an alternative to the client/server networks which have become widespread up to the present time. This is because, through their distributed architecture, station-to-station networks make it possible to share a large number of digital data between a large number of users, without for all that requiring an expensive infrastructure.

In practice, in a station-to-station network, each station fulfills the role of client and server. Thus each station can request data or a digital document from any other station in the network and the exchange of data can take place directly from one station to another.

Hereinafter, the term "document or digital data" applies both to images or digital videos, or to digital text files or the like.

Thus, in a station-to-station data exchange, each station can be both client and server.

This means that the digital data received by a client station can then be served to other users by said client station.

The digital data accessed by many persons can therefore be replicated on several machines and served by more servers.

The system therefore adapts all alone to demand and the communication storage costs are distributed between all the servers.

On the other hand, in a conventional client/server system, the data are served by a single server or by a set of machines fixed in advance.

The capacity of these conventional servers must be sized in advance, which results either in oversizings (the cost of the server is then too high) or undersizings (the data are not served sufficiently rapidly).

Another advantage of the station-to-station system is that the digital data are served directly from the machines of the users.

The storage space can therefore be considered in practice to be unlimited.

However, station-to-station networks are unstable. This is because the client devices (and consequently the server devices) connect to each other and disconnect from each other periodically on the network, thus making the presence of the data very haphazard. In addition, the addresses of the client and/or server devices are unpredictable and liable to be different at each connection.

As a result access to the contents in a communication network of the station-to-station type still constitutes a significant difficulty, since the latency for obtaining the data is no longer simply due to the time necessary for recovering the data as in the conventional client/server topology, but also the search time for a server device having these data available.

According to the topology of the station-to-station network concerned, this search phase may be not insignificant.

In the context of the invention, the context is more precisely adopted of a communication system exchanging digital data by means of digital containers of these data.

For example, the digital data are digital photographs/images which can be represented in hierarchical storage format with multiple representations (in terms of resolution and memory size).

A digital container of such data is for example a collection of digital photographs, that is to say a container of references to these images, where various sub-parts or representations can be situated on different machines in the network.

The majority of station-to-station data exchange systems are intended for exchanging public data: the whole world can access a shared data item.

The present invention is preferentially concerned with a particular context where the data exchanged are personal. It is a case for example of images or videos which a person wishes to share with his friends or family, that is to say a restricted number of users. The data are then not public.

In this context, it is necessary to have a system for restricting access to the data. A list of documents and an associated access list are grouped together in the collection. When sharing, the collection is sent to all the addressees. Each one decides to accept the collection or not. If the addressee accepts the collection, this supplements the local access list of the client machine for each of the documents contained. Likewise, for the creator of the collection, the new collection supplements the local access lists.

The control of access to the data from the client machines is based on the trust of a person who is sharing a personal data item with regard to an addressee who has received this data item: the server of the addressee must, in dealing with access to his machine and the validity of the requests, comply with the restrictions proposed by the creator of the data. However, the destination can apply a different limitation of access to the data which he has received.

A so-called hybrid station-to-station system has the particularity of comprising a permanent server (also referred to as a central server), which can serve for registering users, and controlling the connection of the client machines of these users.

For the purpose of increasing the availability of the digital data on the station-to-station network and thus promoting the broadcast service quality, the central server can also store, locally and temporarily, limited versions of personal digital data.

The Applicant has posed the problem for itself of supplying access control as well as control of the sharing and distribution of the personal documents on the central server of a hybrid station-to-station network.

SUMMARY OF THE INVENTION

The present invention affords precisely a solution to this problem.

It relates in particular to an access control applicable to a permanent (central) storage server of a hybrid station-to-station network and independent of a particular user.

Thus it relates to a method of controlling access to a collection of digital data created by a client station, the method being implemented on a central server station in a communication network of the hybrid station-to-station type.

According to a general definition of the invention, the method comprises the following steps:

E601) receiving, from the client station, a request to validate a collection designated by a collection identifier and comprising, for each data item belonging to the collection, a data identifier designating said data item and at least one chosen representation of said data item;

E602) for each data identifier thus received, locally obtaining a representation of the data item associated with the said collection; and E603) comparing the representation thus received with the local representation and, in the case of positive comparison, validating said digital data item to be shared.

Such a method according to the invention thus makes it possible to ensure that the client station sending the validation request does indeed possess all the digital data in the collection to be shared on its machine and therefore that it does indeed have access to these digital data.

According to one embodiment of the invention, the validation step E603) is followed by a step E804) of calculating a signature of said collection of digital data, in the case of positive validation of each of the digital data belonging to the collection.

In practice, the step E804) of calculating the signature of the collection is followed by a step E807) of sending this signature to the client station.

Thus the client station will easily be able to prove subsequently to any other client station in the network that the collection which it is sharing is valid.

According to another embodiment, each collection of digital data is stored locally in response to a positive validation of each digital data item to be shared issuing from step E603).

In this way, the central server stores only valid collections which can be shared in the P2P network according to the control of the access rights set up.

According to yet another embodiment, the step E602) of obtaining the representation of the data item associated with the collection comprises the following steps:

a) locally seeking a version of said digital data item;
b) in the case of a positive search, obtaining a signature of said version of said digital data item; and
c) calculating, by means of a non-reversible function, the representation of said digital data item from the signature and the collection identifier of said collection.

In the case of a negative local search at the end of step a), the method also comprises the step E607) consisting of seeking a version of the digital data item identified by a data identifier on the network, and step E707) consisting of locally storing said version thus obtained from a client station.

Thus the central server is ensured of locally storing versions of digital data referenced by the collections currently being validated. In addition, by virtue of steps b) and c), the central server can verify the presence on the sending client station of the validation request and the integrity of the versions of the data referenced by the collection.

In practice, the method also comprises a step of verifying the identity of the client station sending the validation request, established by means of a chosen authentication function.

According to one characteristic of the invention, in the case of negative comparison at step E603), the following steps are provided for:

1) checking whether at least one chosen representation of said data item is in the form of a supplementary collection identifier designating a supplementary collection;
2) obtaining the supplementary collection designated by said supplementary collection identifier, containing at least one representation of said digital data item designated by said data identifier;
3) checking whether said supplementary collection contains a client station identifier corresponding to the client station sending the validation request; and
4) in the case of positive verification, validating said digital data item to be shared.

In addition, in the case of positive verification at the end of step 3), the step is provided consisting of obtaining a representation of said data item associated with said collection and the step consisting of inserting the representation of the data item thus obtained in the collection.

According to one important characteristic of the invention, the method also comprises, prior to step E601), the following steps relating to the creation of a collection of digital data on a client station intended to be validated by a server station in a communication network of the hybrid station-to-station type:

E501) generating a unique collection identifier designating the collection of digital data to be validated and inserting said collection identifier in the header of the collection;
E503) obtaining a unique data identifier for each digital data item to be referenced in the collection;
E504) obtaining a signature of a representation of at least one digital data item; and
E505) inserting in the collection the data identifier and the representation of each associated digital data item.

In the case of negative obtaining at the end of step E504, provision is made for seeking a collection identifier corresponding to a collection containing the data identifier and the identifier for the client station sending the validation request, and substituting the collection identifier thus found for the representation of said digital data item.

The collection document intended to be validated by the central server is thus created according to a method compatible with the validation steps according to the invention implemented by the central server and mentioned above.

According to another embodiment, the access control method also comprises a method of checking the integrity of a digital data item forming part of a collection of digital data created by a distant client station by means of a method mentioned above, the integrity check method being implemented on another client station, in a communication network of the hybrid station-to-station type, characterized in that it comprises the following steps:

i) receiving said collection designated by the collection identifier and comprising, for each data item belonging to the collection, a data identifier designating said data item and at least one chosen representation of said data item;
ii) verifying the signature of the collection and, in the case of positive verification;
iii) requesting at least one digital data item from a distant server station previously sought on the network, from the data identifier and collection identifier;
iv) receiving, coming from the distant server station, the said digital data item;
v) locally obtaining the representation of the data item associated with said collection, from the digital data item received and the collection identifier;
vi) comparing said representation obtained locally with that present in said collection; and
vii) in the case of positive comparison, locally storing the digital data item received.

Another object of the present invention is a device for controlling access to a collection of digital data created by a client station belonging to a communication network of the hybrid station-to-station type.

According to one important characteristic of the access control device, said device comprises:

means for receiving, coming from the client station, a request to validate a collection designated by a collection identifier and comprising, for each data item belonging to the collection, a data identifier designating said data item and at least one chosen representation of said data item;

for each data identifier thus received, means for locally obtaining a representation of the data item associated with said collection; and processing means able to compare the representation thus received with the local representation and, in the case of positive comparison, validating said digital data item to be shared.

Another object of the present invention is an information medium which can be read by a computer system, possibly totally or partially removable, in particular a CD-ROM or magnetic medium, such as a hard disk or a floppy disk, or a transmissible medium, such as an electrical or optical signal, characterized in that it comprises instructions of a computer program permitting the implementation of a processing method of the type described above, where this program is loaded into and executed by a computer system.

Finally, an object of the present invention is a computer program stored on an information medium, said program containing instructions permitting the implementation of a processing method of the type described above, when this program is loaded into and executed by a computer system.

BRIEF DESCRIPTION OF THE DRAWINGS

Other characteristics and advantages of the invention will emerge in the light of the following detailed description and the drawings, in which.

DETAILED DESCRIPTION OF THE INVENTION

The present invention applies to any mono or multiresolution digital document. The description which follows describes the method of the invention, relying on the example of multiresolution data, but this is proposed only for the reasons of optimization of resources, which is not directly related to the invention: this is because the right of access to a document or to a sub-part of a document is managed in the same way. The description is based on an example of an optimum system where the central server stores only low-resolution versions (small memory size) of the digital data.

It can be entirely envisaged that this invention will be used with various digital files such as:

fixed digital images whose low-resolution representation is a thumbnail, video (the start of a video stream can for example represent a minimum description of the complete video), computer files of office machinery application (often the first bytes of these files make it possible to know the type of software application required to read them, and thus the user for whom the sharing is intended can choose those of the files which he is able to display).

In a favored mode, the multiresolution data shared by the invention are digital images/photographs.

Figure 1:
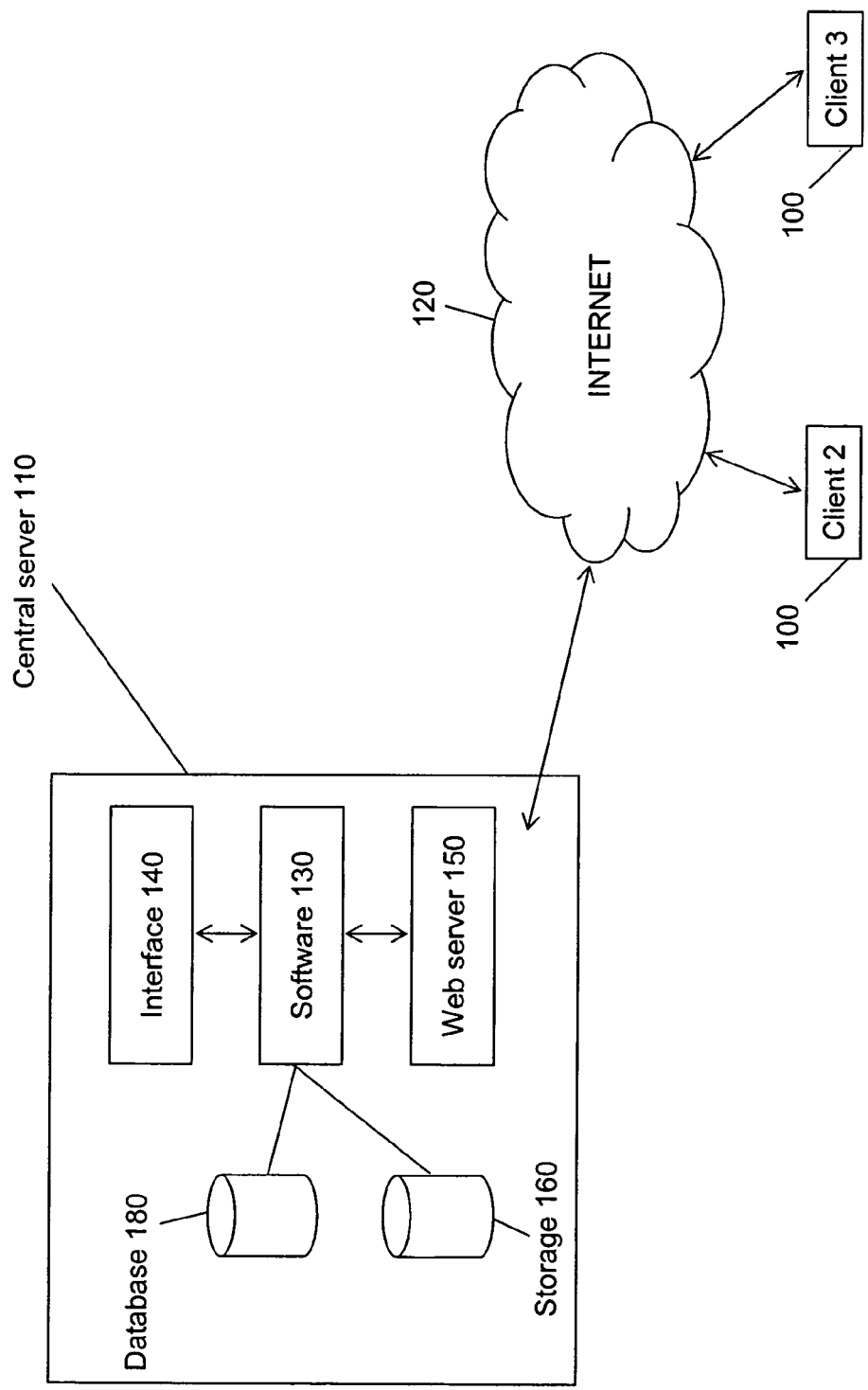
FIG. 1 depicts a device implementing the invention.

The system, for which FIG. 1 gives an overall view, is composed of several entities connected in a network. The network 120 such as the Internet allows client/server architecture communications where each client station 100 periodically accesses a central server station 110. Peer-to-peer connections amongst the client stations 100 of the users are also made in order to exchange the data to be shared, and this independently of the server. The users connect to the network with different methods: for example high-speed modems of the DSL type, low-speed, or cable, but also from mobile telephone sets, for example of the GSM type. The network 120 can just as well be a private local network (LAN). The central server 110 can also be composed of several servers coupled together and accessible from a single network address.

The client terminals or stations 100 can communicate directly or by means of the central server 110. Each server 110 can for example be a device as described in FIG. 2, and comprise in particular: a volatile data storage device 160 (referred to as a cache memory, which may contain long-life data such as images, but also more volatile data such as address lists), and a man-machine interface which affords interaction with an administrator of this server.

Figure 2:
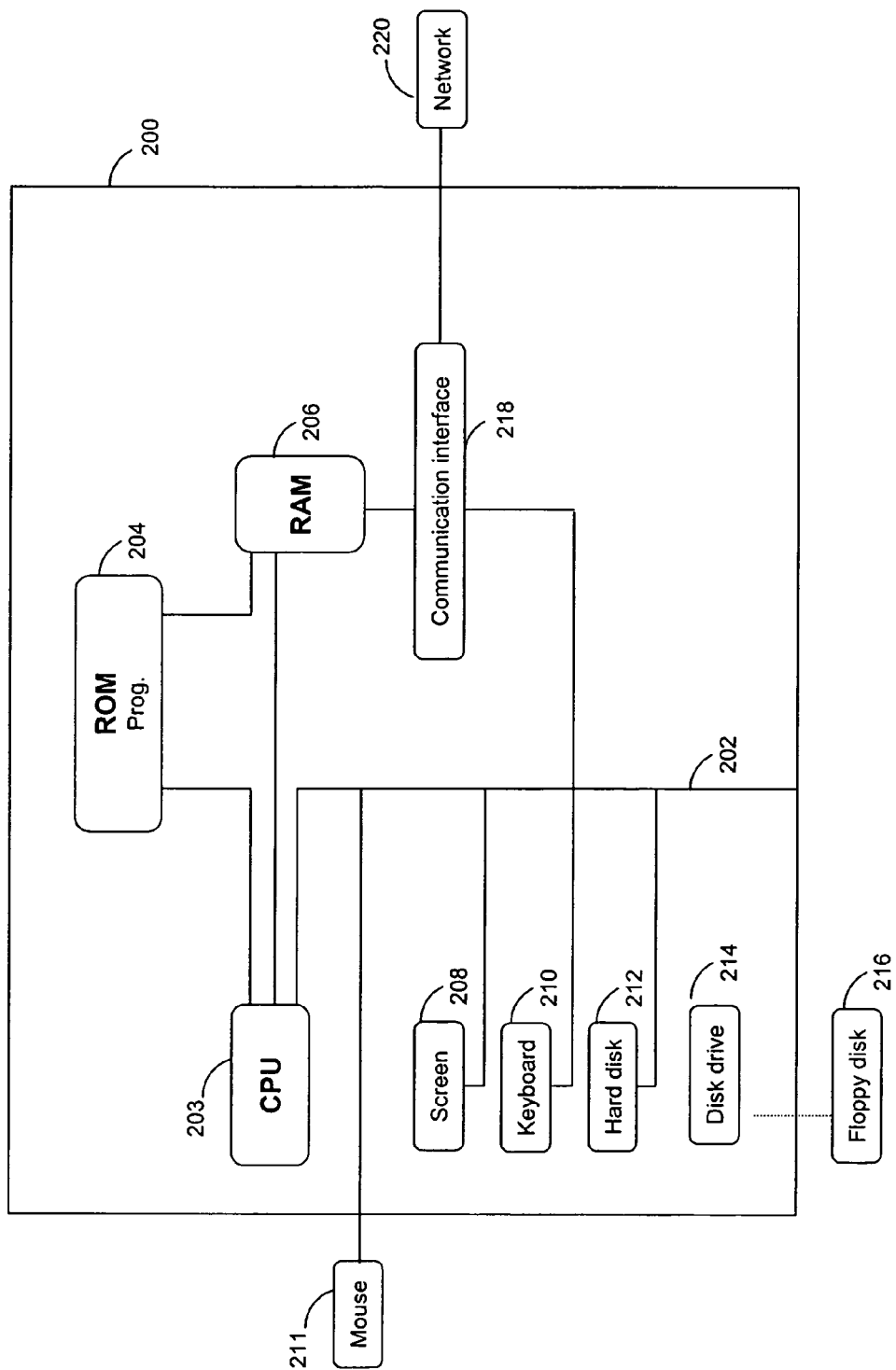
FIG. 2 depicts schematically a device of an apparatus implementing the invention.

The terminals 100 can also be a device as described in FIG. 2, but also a digital assistant or a photographic apparatus or a portable telephone. These appliances 100 can be connected to various peripherals such as, for example, a digital camera 201 (or a scanner or any other image acquisition or storage means) supplying multimedia data.

The computer appliances (central server) 100 can execute an application (computer software 130) containing the algorithms of the invention. Each server 100 comprises a display interface 140 (which may correspond to an Internet browser) coupled to a Web server 150. The Web server 150 is a conventional server (such as Apache or Microsoft IIS) executing software modules 130 peculiar to the invention. According to another possibility, the software 130 and server 150 are a single entity. The central server 110 is also composed of a storage device such as a hard disk 150 on which the data to be stored temporarily will be stored (in particular the thumbnails relating to the digital photographs to be shared), and a database 180 containing unique identifiers of the various entities of the global system (in particular the identifiers of the users, images).

The hardware device relating to the central server 110 is detailed in FIG. 2.

An apparatus implementing the invention is for example a microcomputer 200 or a workstation. This apparatus is connected to various peripherals such as for example any image storage means connected to a graphics card and supplying multimedia data to the apparatus.

The apparatus 200 comprises a communication bus 202 to which there are connected:

a central processing unit 203 (microprocessor), a read only memory 204, able to contain the programs "Prog" supporting the invention, a random access memory 206 (cache memory), containing registers adapted to record variables and parameters created and modified during the execution of the aforementioned programs, a screen 208 for displaying data and/or serving as a graphical interface with the network administrator, who will be able to interact with the programs according to the invention by means of a keyboard 210 or any other means such as a pointing device, such as for example a mouse 211 or an optical pen, a communication interface 218 connected to the distributed communication network 220, for example the Internet, the interface being able to transmit and receive data.

The apparatus may optionally have a hard disk 212 able to contain the aforementioned programs "Prog", a disk drive 214 adapted to receive a floppy disk 216 and to read or write thereon the data processed or to be processed according to the invention.

The communication bus affords communication and interoperability between the various elements included in the microcomputer 200 or connected to it. The representation of the bus is not limiting and, in particular, the central unit is able to communicate instructions to any element of the microcomputer 200 directly or by means of another element of the microcomputer 200.

The executable code of each program enabling the programmable apparatus to implement the processes according to the invention can be stored for example on the hard disk 212 or in read only memory 204.

According to a variant, the floppy disk 216 can contain data as well as the executable code of the aforementioned programs which, once read by the apparatus 200, will be stored on the hard disk 212.

In a second variant, the executable code of the programs can be received by means of the communication network 220, via the interface 218, in order to be stored in an identical fashion to that described previously.

The floppy disks 216 can be replaced by any information medium such as, for example, a compact disk (CD-ROM) or a memory card. In general terms, an information storage means which can be read by a computer or by a microprocessor, integrated or not into the apparatus, possibly removable, is adapted to store one or more programs whose execution enables the method according to the invention to be implemented.

In more general terms, the program or programs can be loaded in one of the storage means of the apparatus 200 before being executed.

The central unit 203 controls and directs the execution of the instructions or portions of software code of the program or programs according to the invention, instructions which are stored on the hard disk 212 or in the read only memory 204 or in the other aforementioned storage elements. On powering up, the program or programs which are stored in a non-volatile memory, for example the hard disk 212 or the read only memory 204, are transferred into the random access memory 206 (RAM), which then contains the executable code of the program or programs according to the invention, as well as registers for storing the variables and parameters necessary for implementing the invention.

It should be noted that the communication apparatus comprising the device according to the invention can also be a programmed apparatus.

This apparatus then contains the code of the computer program or programs, for example fixed in an application specific integrated circuit (ASIC).

Figure 3:
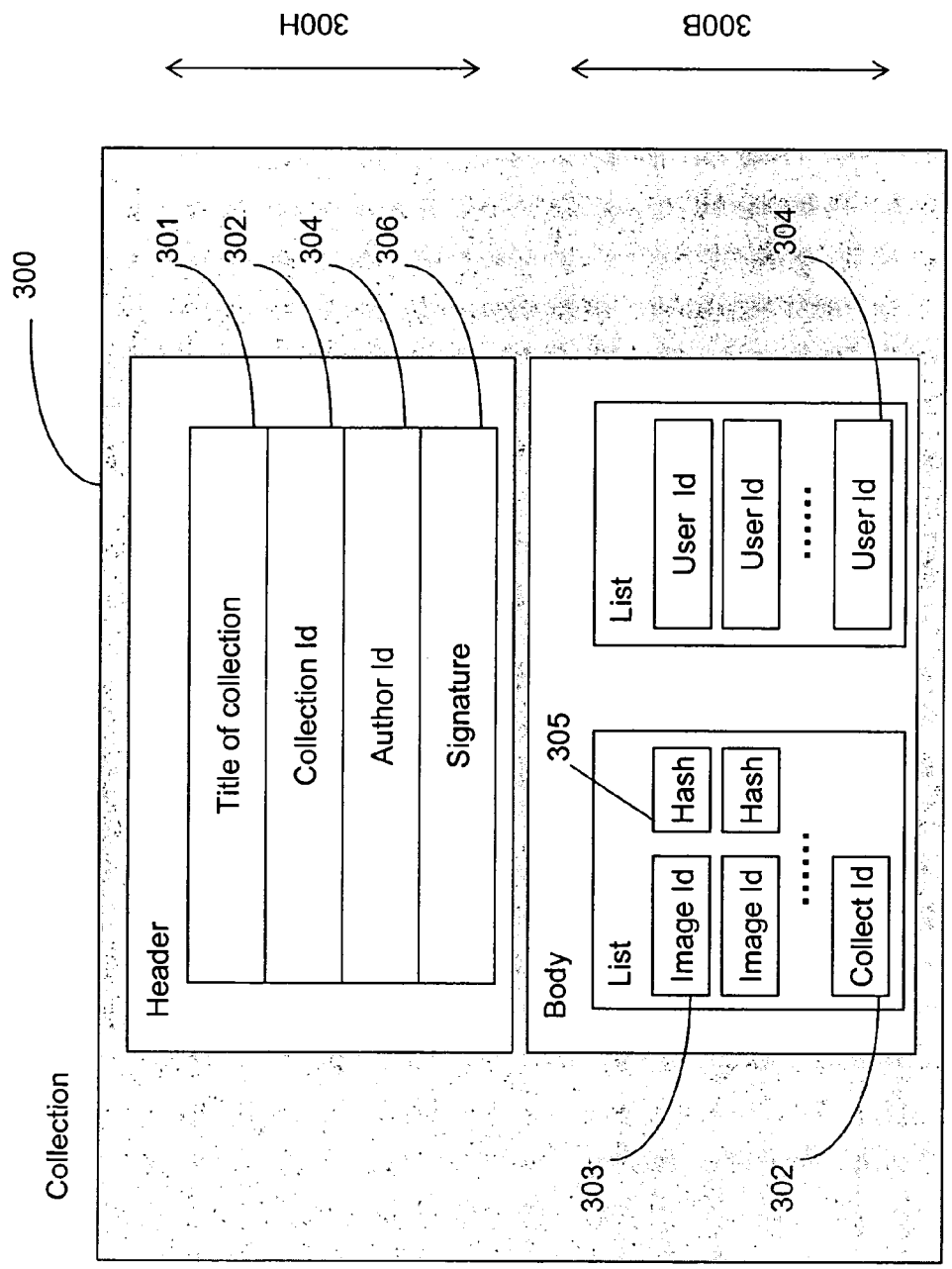
FIG. 3 depicts schematically a collection.

With reference to FIG. 3, a collection 300 (list of identifiers of the images to be shared) is a set of references on media contents (image, video, sound), with metadata. By extension, a collection can contain collections (referred to as sub-collections).

In the description which follows, the case is adopted of the sharing of a collection of digital images by an archiving system in a network of the "peer-to-peer" type.

In this context the following terms will be used

"thumbnail": the low resolution version of a digital image; and

"image": the high-resolution of this digital image.

Naturally the invention is not limited to solely two resolutions.

Thus, hereinafter, the term "multiresolution image" will be given both to digital images with a multiresolution format (such as the JPEG2000 format for example), and single-resolution digital images (for example the jpeg format): in this second case, the concept of multiresolution is supported by the construction of independent files corresponding to different resolutions obtained from one and the same high-resolution image file.

Each object corresponding to a digital image is identified by a data identifier 303, created on the machine of the user. This data identifier 303 is assigned by the client application even if it is not connected to the network. One solution consists of producing random numbers locally. Optionally these data identifiers can be unique in order to facilitate searches on the network. Tools well known to persons skilled in the art make it possible to generate data identifiers with a minute probability of duplication.

Images will likewise be defined by a data identifier 303 by the application of the client as soon as a new image is added to a collection (if the image is copied from an existing collection, it will preserve the original data identifier). However, a thumbnail has the same data identifier as an image. In order to precisely determine an object (image or thumbnail), the data identifier 303 must be associated with a data "typing": the majority of the time, this typing is implicit according to the requests sent over the network (in the case of downloading, the image is requested whilst the thumbnail is useful for simple display).

Each user also has a unique user identifier 304 supplied by the central server during the process of registering the user. This property is useful for reducing to the minimum the risk of multiple registrations for the same user. In the preferred embodiment, by purchasing the client software, the purchaser registers his software and establishes with the central server an account which identifies this user. This account identified by the user identifier 304 serves for a connection of the client either by the standard software or by an Internet browser.

In the preferred embodiment described here, a collection 300 comprises:

firstly a header 300H comprising a collection title 301, a collection identifier 302 for the collection and a user identifier 304 corresponding to the author of the collection. A signature 306 for verifying that the collection was indeed created by the author 304 and has been validated by the central server 110 in accordance with the method of the invention can be added. The signature 306 is fabricated on the central server 110 with the proper private enciphering key of the said central server. To validate a signature 306, the client 100 can either have available the public key corresponding to the private key which was used to sign the connection (in this case it can decrypt the signature and compare the value obtained with its own collection signature calculation) or it can have recourse to the central server 110 in order to validate the signature 206. The creation of the signature 304 will be described subsequently. Other metadata can be added, such as the date of creation etc;

secondly, a body 300B comprising a list of data identifiers 303 for the digital objects in this collection. With each data identifier 303 there is associated a unique representation 305 (for example here called hash) for the current collection 300 calculated according to a method described below with reference to FIG. 5. There is no representation 305 for a sub-collection having a collection identifier 302. The collection contains also a distribution list (list of users identified by the user identifiers 304 authorized to display the collection).

The creation of a collection without right of access by a user does not come under the invention. There exist well known methods in the state of the art which deal with images and their association with image containers. For example, the user can copy an image from the graphical interface of the operating system of his computer and deposit it in the graphical interface 140 of the computer software implementing the invention. The user can structure his images, collections and sub-collections so as to finally to record each collection 300 created in the form of a list of image identifiers, of sub-collections. Each collection can possibly comprise one or more metadata of small memory size, for example a thumbnail representing the whole of the collection.

A physical representation of a collection may for example consist of a coding in XML language:

```
<?xml version="1.0" encoding="utf-8"?>
<COLLECTION COLLECTION_ID="2c9461ec-
0df2-7b4a-9ff0-d17cdca229a7">
    <COLLECTION_METADATA>
        <TITLE VALUE="my collection"/>
        <CREATOR UID="a782e3f6-8fb5-9646-abc5-5cac76c099c4"/>
        <ACCESS RESTRICTED="TRUE">
            <RECIPIENT UID="5bca700e-3320-3f49-9d79-
            efe702336366"/>
            <RECEIPIENT EMAIL_HASH="name@company.com"/>
        </ACCESS>
        <SUGNATURE VALUE=""/>
<COLLECTION_METADATA>
<IMG CONTENT_ID="f092cefa-ad7f-0a43-
9266-c60c7a41b621">
    <METADATA>
        <CAPTION VALUE="my_first_image.jpg"/>
        <HASH VALUE=""/>
    </METADATA>
</IMG>
</COLLECTION>
```

Figure 4:
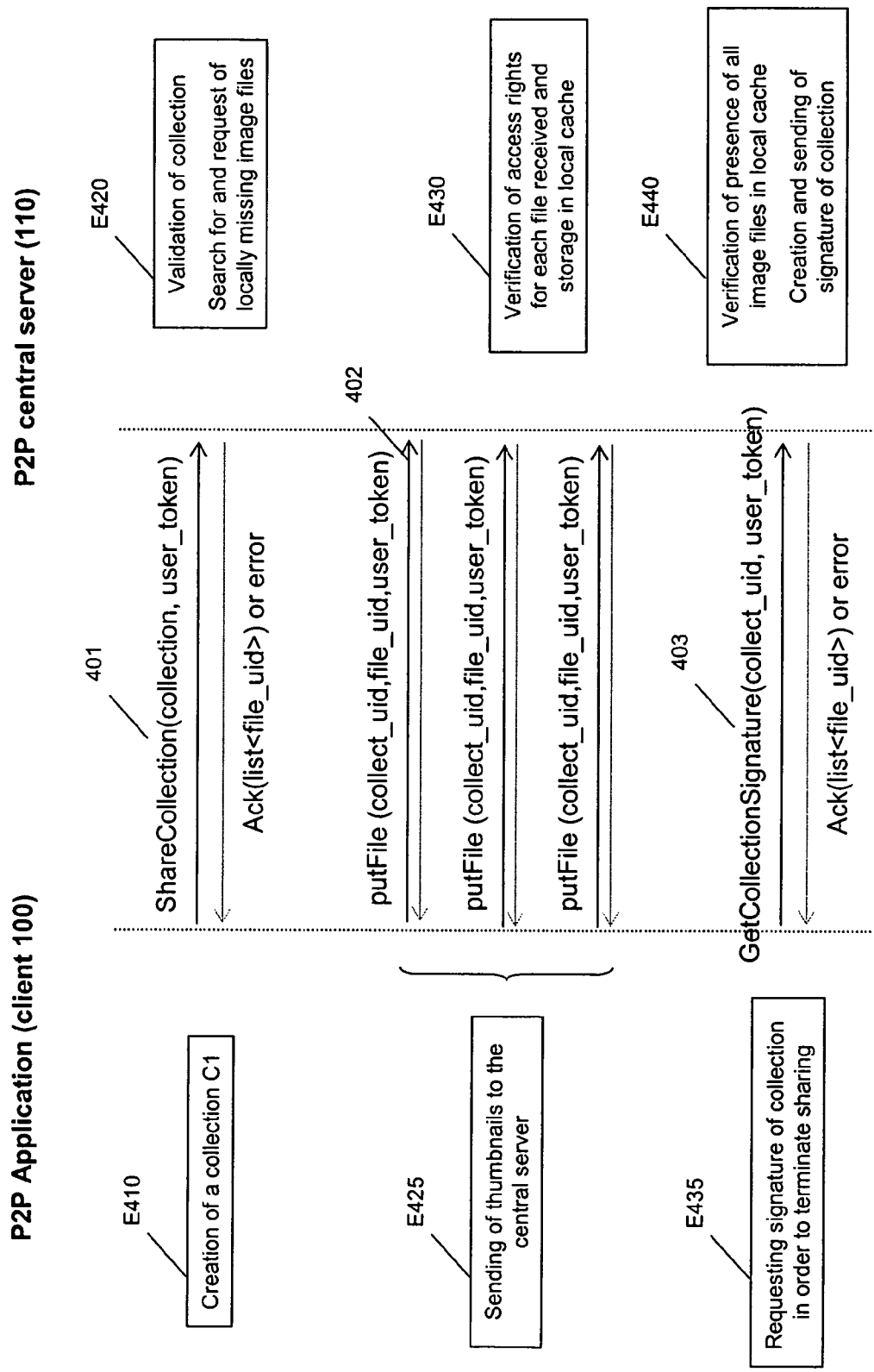
FIG. 4 depicts schematically a flow diagram illustrating the sharing of a collection.

FIG. 4 presents the scenario of sharing a collection between a client application executed on a machine 100 and the algorithms of the invention executed on the central server 110.

A user creates a collection C1 with addressees (step E410 described with reference to FIG. 5). This collection C1 is then sent to the central server 100 in a message 401. This message is for example formatted in XML mark-up language such as SOAP, and transported by the HTTP communication protocol in a request of the POST type.

In response to this validation request 401, the central server 110 validates the collection in accordance with step E420, the substeps of which are described with reference to FIG. 6. Where applicable, the central server seeks the thumbnails which it is lacking locally.

A series of messages 402 follows in order to send to the central server 110 the thumbnails requested (step E425). These messages are for example HTTP PUT messages. Each message comprises a reference 302 to the collection C1, the data identifier 303 of the thumbnail and the thumbnail itself.

Figure 7:
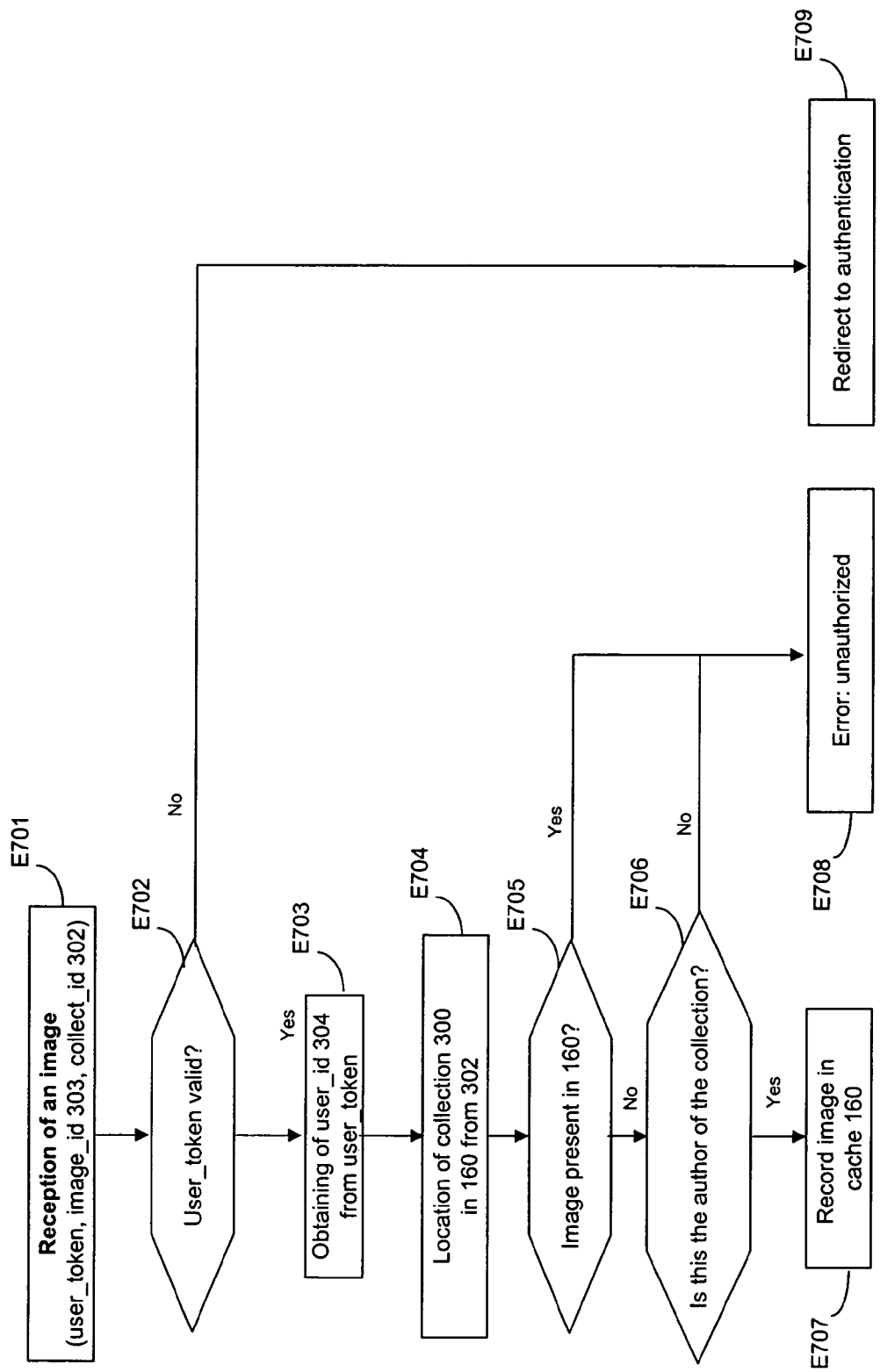
FIG. 7 illustrates the steps of reception of an image file by the central server according to the invention.

The step of receiving the thumbnail files (step E430) consists of validating the data received (FIG. 7).

In practice, it is a case of verifying the access rights for each file received and storing them in the local cache.

When all the thumbnails have been transmitted by the client station 100, the latter can then request that a signature 306 for the collection C1 be created for it (step E435). The message 403 (of the same type as 401) then serves as a communication medium for obtaining the signature 306 from the central server 110. The client station 100 can thus update the signature field 306 of the collection C1 and send the collection C1 to the addressees entered in the user identifier fields 304 of the collection C1. One alternative consists, for the client station 100, of sending a simple notification to the addressees indicating that the collection C1 is now available also on the central server.

Step E440 relating to the verification of the presence of all the image files in the local cache and the creation and sending of the signature of the collection, and executed by the server 110, is described with reference to FIG. 8.

Figure 5:
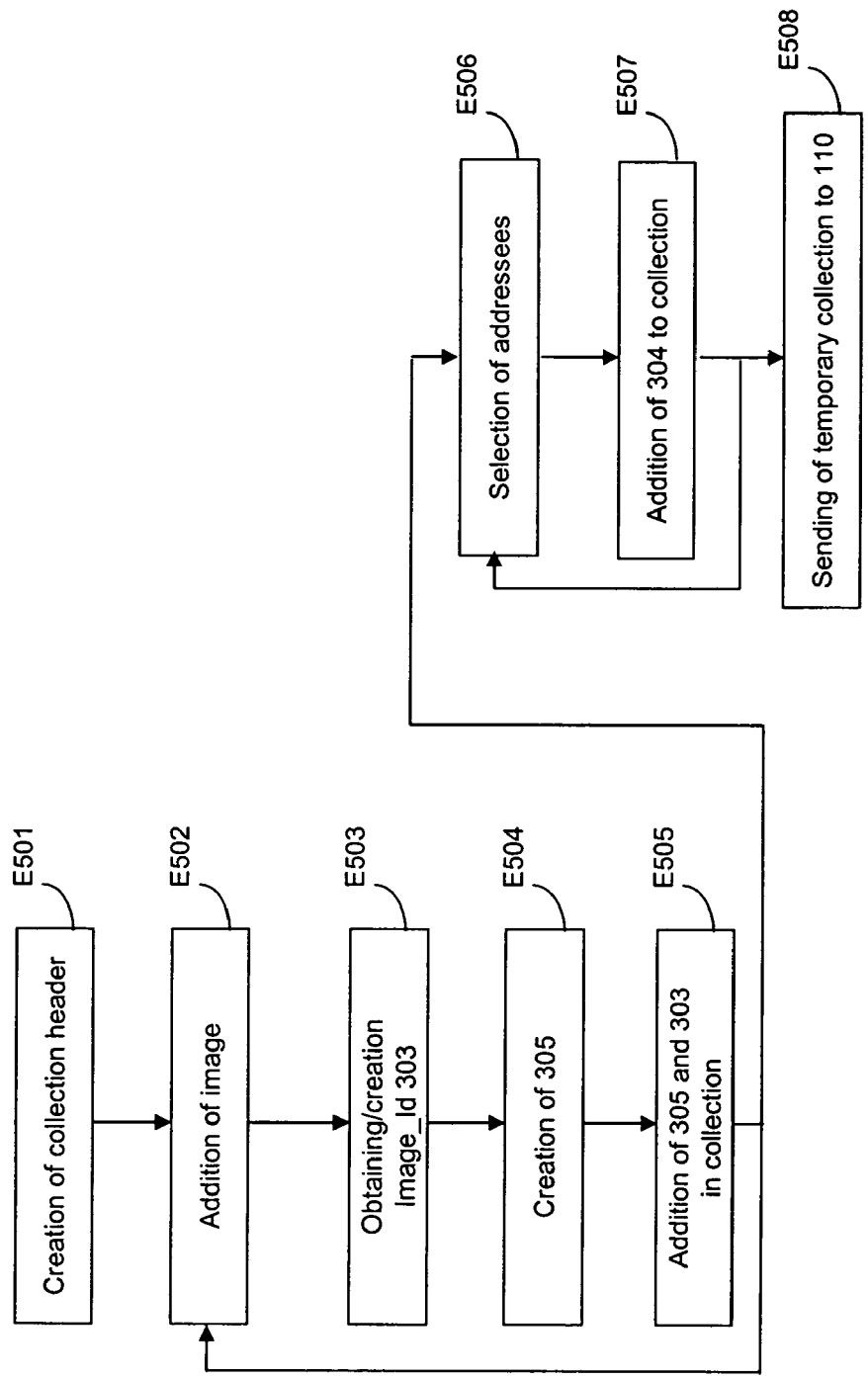
FIG. 5 illustrates the creation of a collection by the client according to the invention.

FIG. 5 shows the steps of the creation of a collection C1.

In a first step E501, the collection headers are created: the user enters a title, the identifier 304 of the author, the date of creation are filled in. A new collection identifier 302 is created.

The user next selects a list of images. It may be a case of images situated in collections already shared or new images of the user (step E502).

For each image (step E504), the client obtains (step E503) a data identifier 303: it may be a case of the identifier of the image in the collection where it was selected or a new identifier if it is a case of a new image. A new identifier can be created by taking for example a random number with sufficient size to have a very small probability of obtaining the same identifier several times.

The data identifier 303 of each image is added to the new collection.

For each image, it is necessary to create a unique representation 305 for the current collection. Two types of representation 305 are envisaged, according to the possibility of obtaining locally or not a version of the current image.

In the case where a version of the image processed is present locally, it is possible first of all to create a representation in the form of a signature of a version of the image. It is preferable to use a small version of the image in order to preserve acceptable performance during processing. For example, the signature is a check sum of the thumbnail or a signature obtained by a hashing algorithm known in the state of the art (e.g. MD5) applied to the thumbnail. The important thing is that this signature be created from a physical data item of the image which only a possessor of this image can obtain (e.g. the data identifier 303 is not sufficient since ill-intentioned users could invent image identifiers without having these images in order to recover them fraudulently).

Next, from the previous result associated with the collection identifier 302 of the current collection 300, a second signature is calculated by a hashing algorithm known in the state of the art (e.g. MD5).

This second signature is the representation 305, which is unique for an image in a collection, since it depends both on a signature of a version of the image and the collection identifier. It thus prevents copying by pirates of the elements 305 in new collections granting them all the access rights: these elements 305 are solely valid in a single collection. In addition, the use of a hash function which is non-reversible does not enable any pirate to find the signature of a version of the image even knowing the representation 305 and the collection identifier 302.

Figure 11:
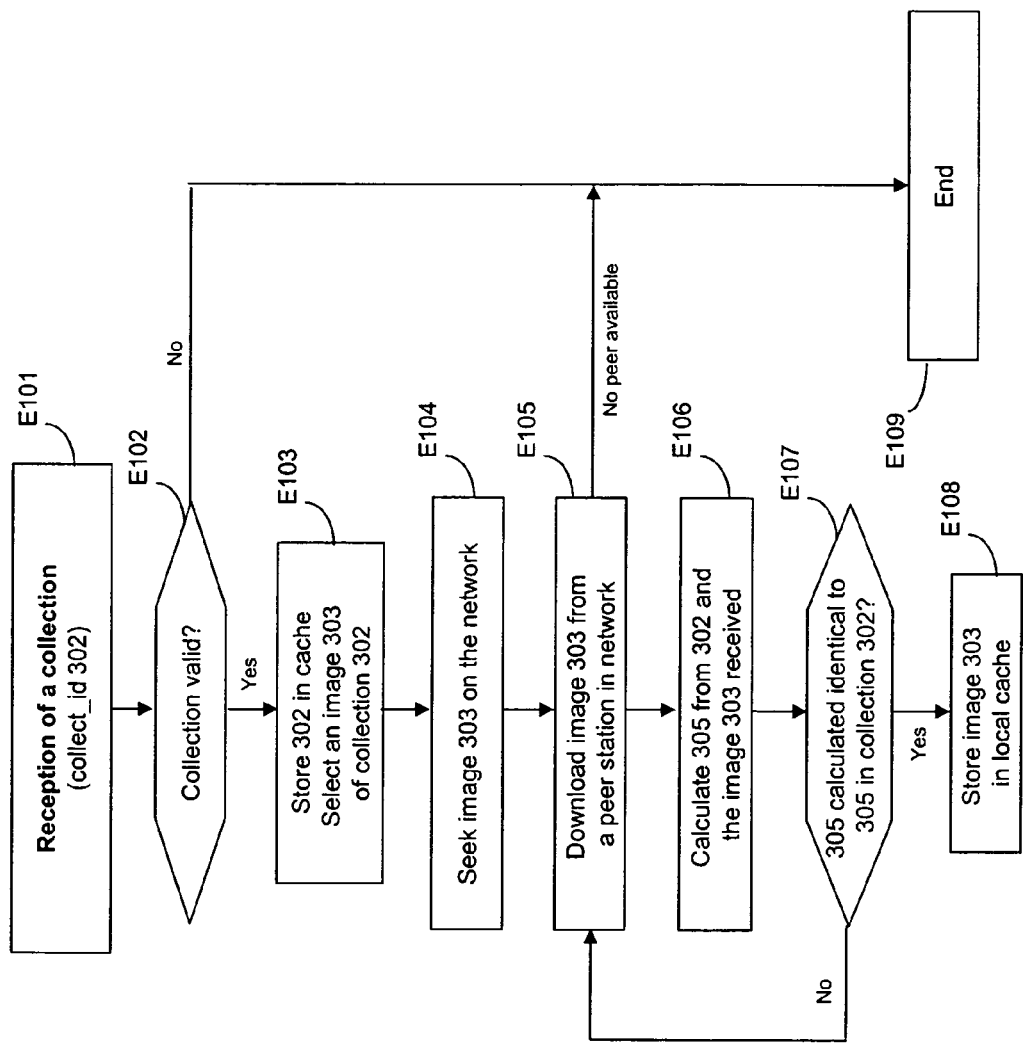
FIG. 11 is a flow diagram illustrating the integrity check on a collection by the client according to the invention.

This representation 305 will serve for the central server 110 to verify the access rights of the sharer to exchange the images concerned, but also, subsequently, for any peer client system, to verify that the thumbnails which said peer system receives are valid (see FIG. 11 below).

In a variant, it is possible to create and add to the collection a distinct representation 305 for each resolution of the image: this is because, according to the type of image used, the thumbnail is not necessarily a unique representation which can be obtained from any resolution of the image, and then only the authenticity of the thumbnail and of the image version from which the thumbnail was created can alone be controlled. In this case, in order to avoid downloading several resolutions of the same image, the central server can decide to limit itself (as described below) to validating the content of a collection with regard to a single representation 305 (for example the one issuing from the thumbnail created with the high-resolution version of the image): the sharer is entrusted with the correct calculation of the other representations 305 inserted in the collection.

In the case where no representation of the image to be shared is present locally, it is possible to replace the representation 305 of the collection with a collection identifier 302 for another collection, referred to again as the supplementary collection, which attests to the right of access of the person to use the image. This is because there may be certain cases where the client station 100 does not locally have images which he is authorized to see:

the client station 100 has been notified of the availability of a collection, but has not necessarily completely displayed it: all the thumbnails have not yet been loaded,
the new collection has been created from an old collection in network disconnected mode: no thumbnail present,
there may have been erasure of the local cache of the images of the machine 100 . . .

The data identifier 303 and the representation 305 obtained by one or other of the methods described above are then added to the collection in accordance with step E505.

The user next gives addressees (step E506): he can select persons in his address book or enter new names. If he has selected a name in the address book the user identifier 304 of the user is known and is added to the list of addressees of the collection (step E507).

If the user enters a new name, the system then interrogates the central server in order to obtain information on the addressee. If the addressee is a person recorded in the system, the central server has allocated to him an identifier 304, who can then be sent to the client station 100 with all the associated information. The client station 100 can then add the name in the address book. The new user identifier 304 can then be added to the list of addressees of the collection.

If the name is not known on the central server, it cannot be chosen as the addressee.

In accordance with step E508, the collection thus created is sent to the central server 110. This collection is referred to as a temporary collection since it can subsequently be modified, in particular by including therein the signature given by the server after validation, and possibly the representations 305 calculated from the versions of the thumbnails which the client machine lacks at the time of sharing (see FIG. 8).

Figure 6:
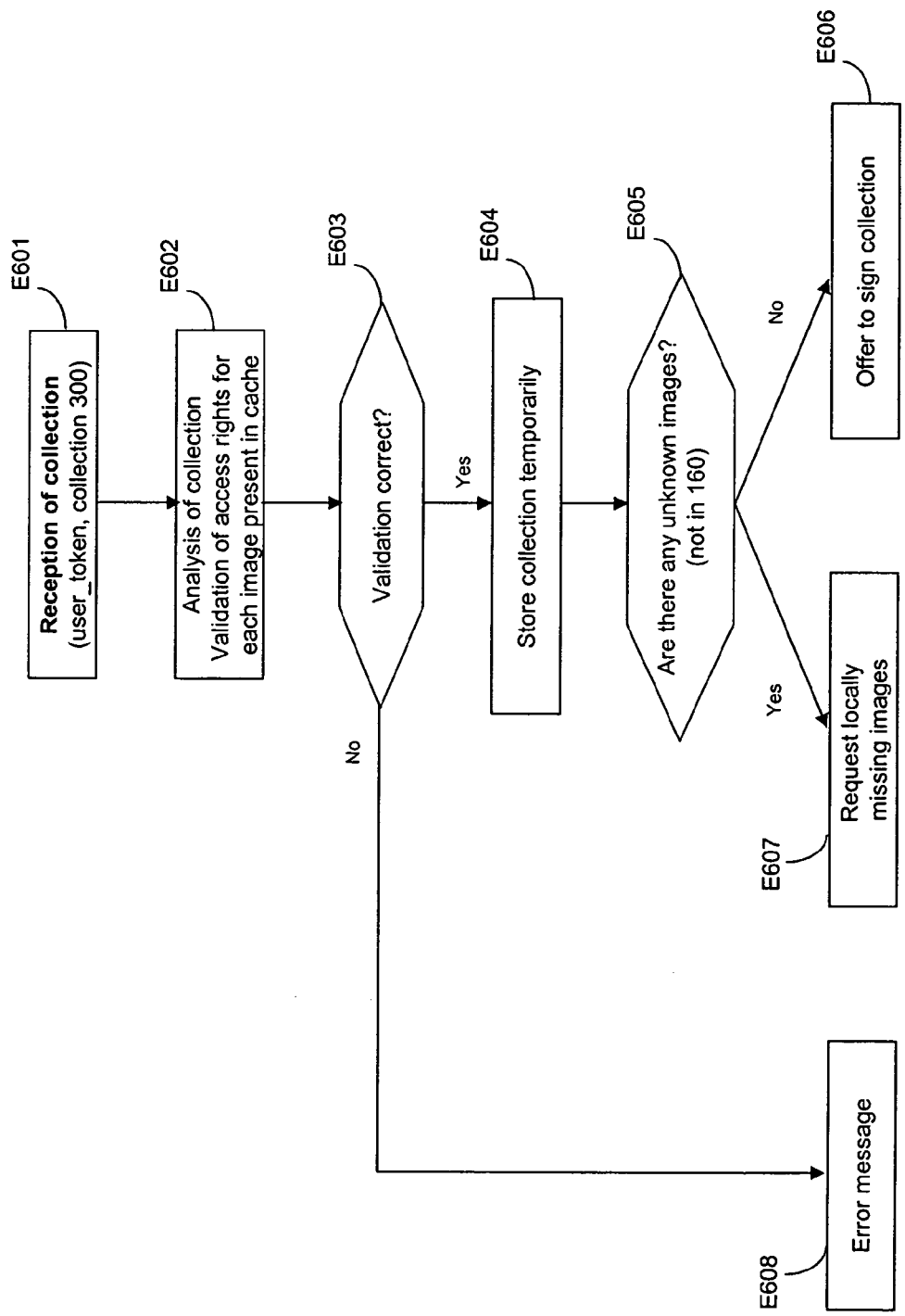
FIG. 6 illustrates the steps of receiving a collection to be validated by the central server according to the invention.

With reference to FIG. 6, a description has been given of the functioning of the software 130 executed on the central server 110, when a client station 100 requires a collection sharing 300 and sends said collection to the central server (step E601) for validation.

In practice, the validation request comprises, for each data item belonging to the collection 302, a data identifier 303 designating said data item and at least one chosen representation 305 of said data item.

For example, the connection to the central server is subjected to an authentication of the user (user token parameter or "user_token") in order to ensure the legality of the sharing procedure. This authentication can be carried out equally well by a Web client (connection protected by SSL) or by a client possessing the peer-to-peer software application (protected SOAP messages): from a pair {user_name, pass_word}, the central server authenticates the person and sends in response a token comprising a validity limit date and attesting to the identity of this person. This token can be sent in the form of a message or "cookie" for a Web connection and/or in a response of the SOAP type to the software application of a peer.

By analyzing the collection received (step E602), the central server 110 is capable of knowing which are the new images from his data cache 160. The central server 110 will use one of the methods of validating the data referenced in the collection according on the one hand to the presence of the thumbnails referenced in the collection in its cache 160 and on the other hand according to the type of representation 305 associated with each thumbnail.

If a thumbnail referenced in the collection by its data identifier 303 is present in the cache 160, it is a case of an image intended to be shared once again by the user: the access rights can therefore be verified. Two cases are then distinguished according to the type of representation 305.

Case 1a: the representation 305 associated with the given identifier is the signature. In this case, a reconstruction of the representation 305 from the thumbnail 303 present in the cache 160 of the central server 110 and the identifier of the collection 103 is carried out for each data identifier 303, applying the same steps as the client during the creation of the collection, described above with reference to FIG. 5. This representation 305 is compared with the representation 305 entered in the collection received. A positive comparison result validates the fact that the user possesses all the known images present on the machine 100 (and therefore the fact that he has access to these images).

Case 1b: for certain images in the collection, the representation 305 chosen is a collection identifier 302 of another collection, also referred to as a supplementary collection, which attests to the access right of the person to use the image.

In this case, the server 110 validates the access rights from the known collection (supplementary collection) and then locally updates the new collection by recreating a representation 305 representing a signature MD5 (same algorithm as the client, described with reference to FIG. 5) or by recovering the signature of the thumbnail previously stored in order not to calculate it many times (see below Case 2a).

If thumbnails referenced by the data identifier 303 in the collection are not present in the cache 160, the system must check whether the images are new. For this, the server preserves the list of image identifiers 303 which it has received coming from the clients: this makes it possible to avoid the same identifier 303 being used for several images unintentionally (the data identifiers are created randomly by the clients) or fraudulently (a person seeks to replace an old image which has expired from the cache 160 of the central server). This list of data identifiers 303 used in the network can be recorded in a table in the database 180, but also in an area of the memory 160 of the server (this area can be architectured so as to optimize the searches for identifiers). Two cases can once again be distinguished:

Case 2a: if data identifiers 303 are found in this list, the previous case 1b applies. As an option, the list of data identifiers 303 can also preserve the result of the operation performed on the thumbnail (checksum or MD5 hashing), in which case, Case 1a can be applied after calculating the signature applied to the signature of the locally known thumbnail associated with the collection identifier specific to the collection currently being validated.

Case 2b: if data identifiers 303 are not found in this list, the corresponding images are considered to be new and the complete validation of the collection will occur once the central server has received all the thumbnails referenced by the collection (step E440, detailed with reference to FIG. 8). This complete validation will comprise all the calculations necessary for obtaining the representation 305 associated with each thumbnail and the comparison of the result with the representation 305 stored in the collection received.

In the case of positive verification with regard to the validity of the collection (step E603), the method passes to step E604, otherwise an error message is sent (step E608).

In accordance with step E604, the collection received (possibly updated with the representations 305 calculated by the central server) thus validated is stored in a temporary area of the cache 160 in order to be signed (complete validation) when all the thumbnails are received and validated.

The client station is next informed of the new procedure to be followed for concluding the validation of the collection: either downloading the locally missing thumbnails (step E607) at the end of a verification step indicating images in the collection which are not in the local cache (step E605, Case 2b above), or directly requesting a signature of the collection if all the thumbnails are already present in the cache (step E606).

With reference to FIG. 7, a description has been given of the functioning of the software 160 executed on the central server 110, when a client station 100 sends an image file following a collection sharing 300.

The user related to the client machine 100 is authenticated (the parameter "user_token" of the request is checked in terms of content and expiry date (step E702).

In the case of negative authentication, the method recommences with a new authentication attempt (step E709).

The collection concerned is located in the temporary area of the cache 160 (step E704).

If the image is already present, it is not replaced and the procedure ends (step E708).

If not, there is a check that the author of the collection 304 is indeed the one who has sent the image (step E706).

The image received (in this case a thumbnail for the requirements of sharing) is recorded in the cache 160 (step E707).

Figure 8:
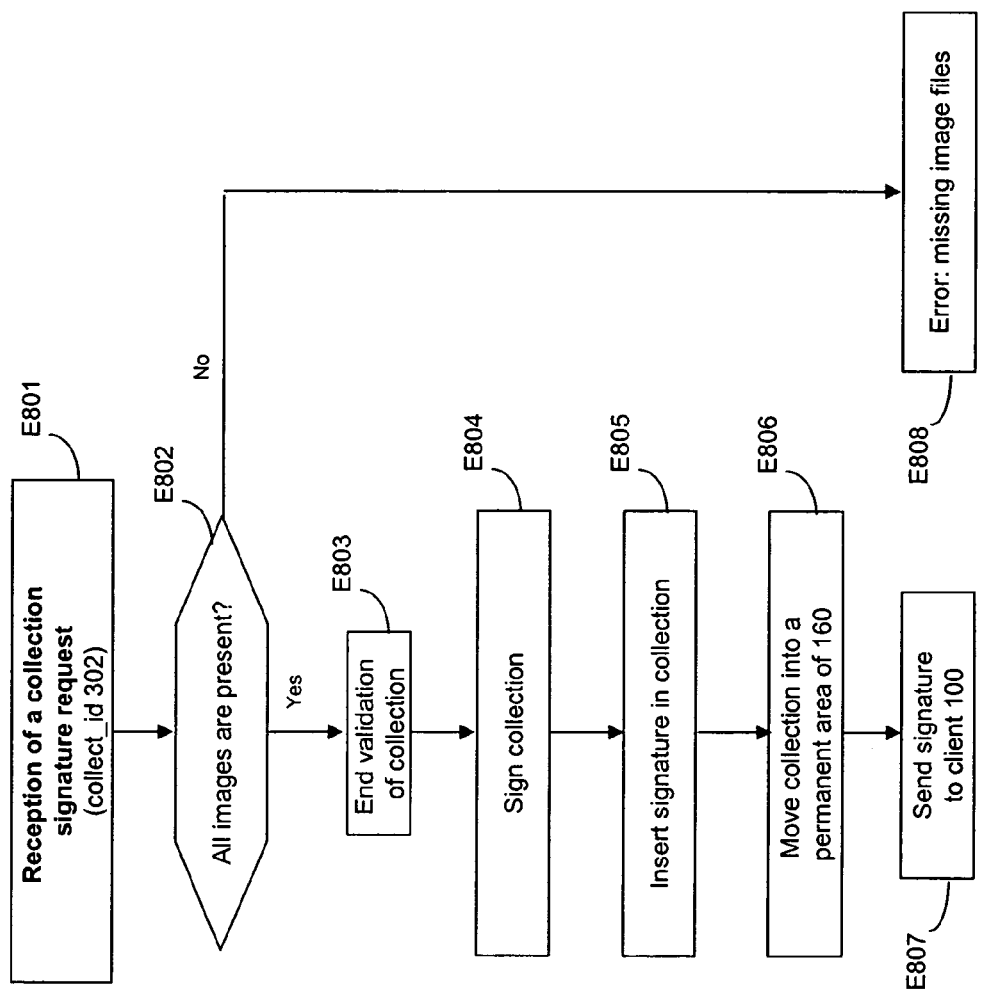
FIG. 8 depicts schematically the steps relating to the reception of a collection signature request by the central server according to the invention.

With reference to FIG. 8, a description has been given of the functioning of the software 130 executed on the central server 110, when a client station 100 requests the validation of the shared collection 300 (step E801).

A necessary condition is that all the thumbnails be present in the cache 160 of the central server (step E802).

In the negative, an error message indicates that files are missing (step E808) and it is possible to return to step E607 in order to request the missing images.

If the validation had not been ended at step E420 corresponding to FIG. 6, the validation test (calculation of the representation 305 from the thumbnail and the collection identifier) is repeated (step E803) for the images received at step E430. In a variant, this validation test is directly performed for each image by the algorithm described with reference to FIG. 7 when an image version is downloaded on the server, in order to immediately eliminate any image received which is corrupted.

After having validated the collection (verification of the list of images and list of addressees), it is necessary to calculate a signature 306 for the collection (step E804). The signature 306 can be calculated by a conventional public key signature system: an imprint of the data to be signed is calculated (the author, the list of images 303 and representations 305, and the list of addressees 304) by an algorithm such as MD5, and then this imprint is encrypted with the private key of the central server by RSA.

The signature 306 thus calculated is inserted in the collection (step E805).

The collection thus obtained and validated is definitive, and can then be moved into a permanent area of the cache 160 of the central server 110 (step E806).

The signature (and possibly the updates made in the collection) is then sent back to the author of the collection (step E807).

All the station systems 100 are able to request the public key from the central server in order to check the collections which they have received.

Thus, with this key, the client stations 100 obtain the certified imprint of the collection and can compare it with an imprint created from the collection received: if the comparison is identical, the collection is authenticated.

Likewise, the client stations 100 can then authenticate the images which they receive from the collection. The various versions of the images are fixed and it is very easy to obtain a thumbnail from a version of the image. This thumbnail corresponding to an image received by the network can be used, conjointly with the collection identifier 302, in the same algorithm as the sharing one in order to calculate the type representation 305, which should be identical to the value 305 entered in the collection.

Figure 9:
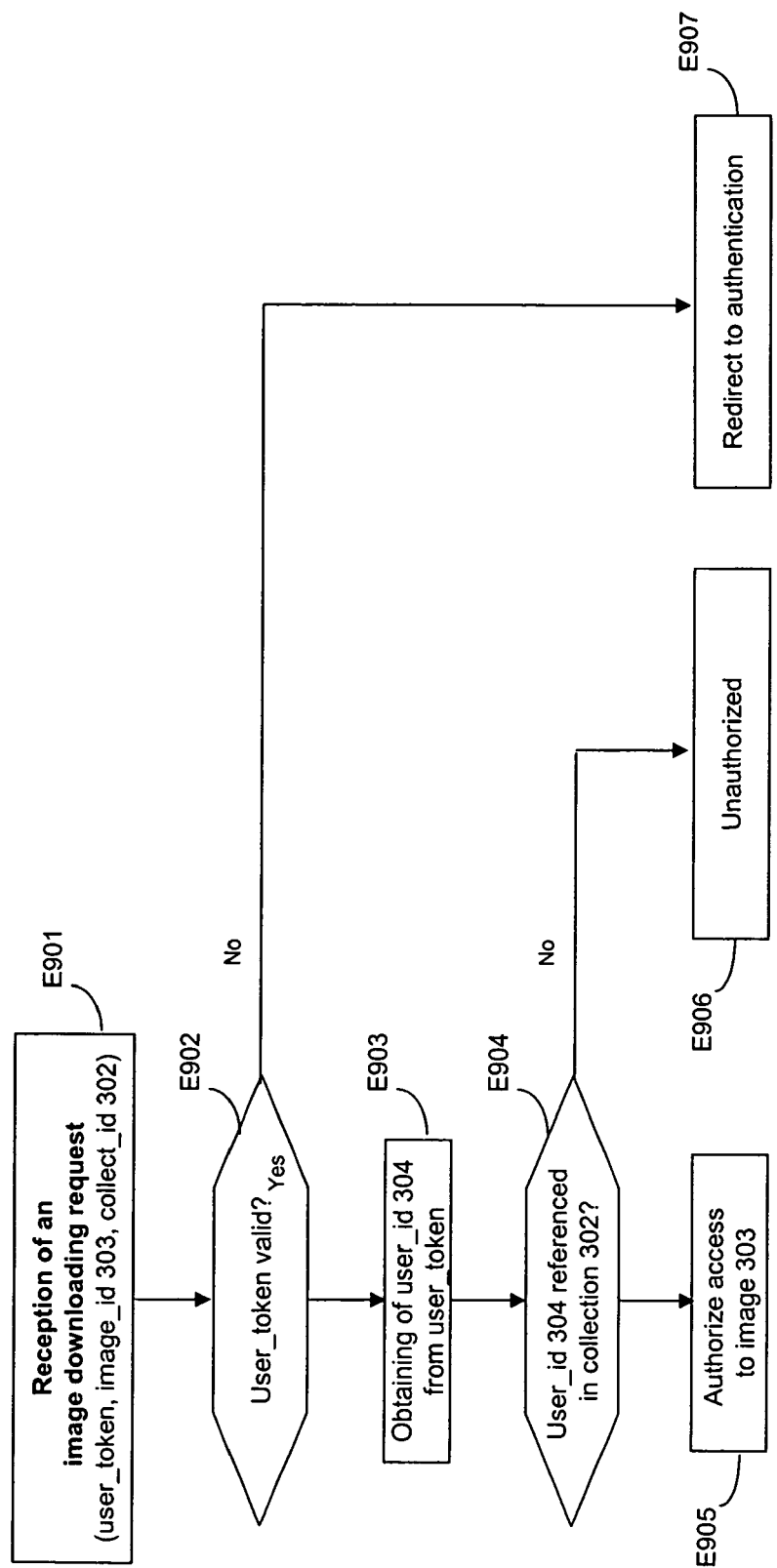
FIG. 9 illustrates the steps relating to a request for access to an image by a client on the central server according to the invention.

With reference to FIG. 9, a description is given of the steps during the reception of a request to serve an image identified by the data identifier 303 belonging to the collection 302 (step E901).

The first step consists of validating the identity of the sender of the request (step E902), expressed by a token identifying the user ("user_token").

A collection identifier 302 for the collection is included in the image request.

If the identification token is invalid, the method recommences with another authentication attempt (step E907).

If the token is valid (step E902), the method passes to step E903.

During step E903, the user identifier 304 is obtained from the token.

Then it is checked whether the image having the data identifier 303 forms part of the list of images of the collection and whether the requester 304 forms part of the list of addressees (step E904).

If the local collection 302 does not authorize the requester 304 to obtain the image, the request is refused (step E906).

In the affirmative, the request for access to the image 303 is authorized (step E905).

Figure 10:
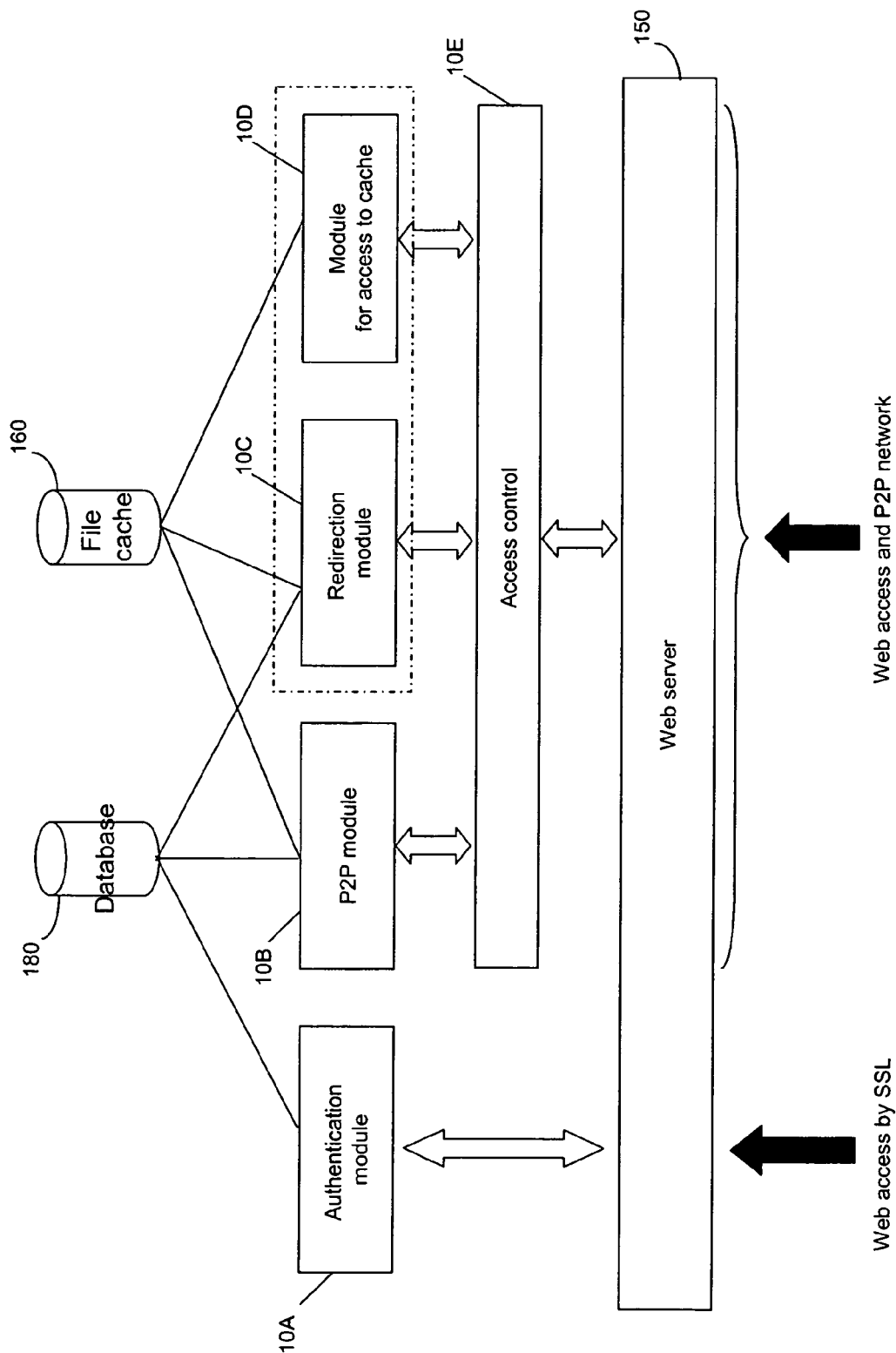
FIG. 10 depicts schematically a complete software architecture for the central server according to the invention.

With reference to FIG. 10, a description is given of an example of architecture of the software 130 based on top of the Web server.

The purpose of the architecture proposed is to offer a central server 110 which is as light as possible, in order to limit its operating cost.

The database 180 contains information necessary for the management of the users and their profiles (a user has registered at least one client software application from a client station 100). It also contains the most dynamic data relating to the connectivity of the peers: a client can obtain the connection information (IP address, port, access through firewall) of another client identified by a unique identifier. The database contains no indication on the location of the data on the network: this management is considered to be totally distributed on the network and does not form part of the invention.

The cache memory 160 contains the shared collections and versions of the associated images. Preferably only the thumbnails and an intermediate version of low resolution are available on the server. A simple cache management policy is implemented so that the lifetime of the collections is much greater than that of the thumbnails, which is itself greater than that of the medium resolutions. For example, a collection can be stored for several months or years, the thumbnails several months and the intermediate versions a few weeks. At the same image resolution level, a policy can be applied in order to count the number of accesses to an image and to store the greatly demanded images longer. In addition, the central server (as well as the peers) can serve the images for users not having a client machine 100 but simple Web browsers: such accesses do not favor the replication of data on the peer-to-peer network and can be considered in the cache policy.

The central server 110 is the first point of entry of the peers on the network. Once a peer is connected, the communications can take place in station-to-station mode with other connected peers. The central server will usually be interrogated subsequently for requests for information on connectivity of the machines and for validation of the collection sharing. The downloading of images from this server 110 for a new collection will decrease as the data are replicated on the peers.

The structuring of the software 130 is broken down into several modules 10A to 10E:

- an authentication module 10A is responsible for recording the users for using the peer-to-peer network and also supplying an authentication key each time a recorded user connects to the network. Each user has a unique client identifier 304;
- a module 10B specializing in "web service" access (e.g. SOAP requests on top of HTTP) is the favored point of entry for communications internal to the peer-to-peer network. It is this module which is responsible for the algorithms in FIGS. 6 and 8. Accesses to the database are required to update the connection tables of the peers, give information to the peers on the presence of friendly peers, etc;
- the modules 10C and 10D offer a Web access for the images, and can dynamically create HTML pages for clients having available only simple Internet browsers in place of client systems 100;
- the module 10E is responsible for authenticating the users who make requests outside secure connections SSL. For example, a cookie can be used for transporting a token identifying a user.

The module 10D provides access to the collections and to the images of the cache 160 for the client machines 100 and for accesses from Web browsers. It supports the algorithms in FIGS. 7 and 9. For the purpose of improving the performance in terms of reaction time of the service of the images, this module 10D contains no connection with the database, but interacts directly with the data of the hard disk, and this is the reason why a Web server is optimized.

The module 10C supplements the previous one in the event of a problem (e.g. an image is missing) and makes it possible to resolve the resolutions of the locations of the images from connections present in the cache and information on the presence of the machines in the database.

The principle of authentication of the users is as follows:

The sender requests a token from the central server through a secure SSL connection by the module 10A. The latter checks its identity by asking it for a password. It can then give it a token created with the private key of the central server, which encodes the identity 304 of the sender. The token serves for any server on the network (100 or 110) which receives a request in order to thus validate the identity by decoding the token by virtue of the public key of the central server.

This token can be constructed like this one:

Signature$_{[private\ key\ of\ central\ server]}$ (user_id 304, IP address, date) The IP address corresponds to the address visible on the network of the machine to which the user is connected.

The date is a limitation on the life of this token.

With reference to FIG. 12, a description has been given of the steps performed by a client station 100 of a peer-to-peer network at the end of the sharing of a collection of images, validated by the central server.

The client station 100 having available the peer-to-peer application has received a notification of the presence of a new collection intended for it. This notification can be made from a messaging system internal to the peer-to-peer network, or external, such as electronic messaging of the e-mail type. Following this notification, the client station 10 receives the shared collection or knows a location on the network (for example the central server) where this collection can be recovered (step E101).

On reception of the collection, the client station must verify the validity of this collection by virtue of the field 306 of the collection, which was decrypted with the public key of the central server (step E102).

If the validation is correct, the collection is preserved and the user can then choose images to be displayed. For each image selected by the user (step E103), a search on the network can be made by known means of the state of the art (step E104). On reception of any version of an image, the client station must verify the integrity of the data received from any server station in the network and no doubt unknown to the client station 100 (step E105).

For this, the client station 100 applies the algorithms presented in FIG. 5 in order to calculate the representation 305 from the received image of the network and the identifier 302 of the current collection.

In practice, the representation 305 is calculated from the collection identifier 302 and the data identifier 303 of the image thus received (step E106).

According to step E107, if this first representation 305 thus calculated is identical to a second representation 305 present in the current collection identification collection 302, then the image received is recognized as authentic. In this case, it is kept locally (step E108). Otherwise the client station attempts to seek other server stations in the network offering unmodified versions of the required image.

The invention claimed is:

1. A method of validating access rights to a collection of digital data created by a first client station, the collection being designated by a unique collection identifier and comprising a list of digital data items to share with one or more second client stations each identified by a different unique client station identifier, said method being implemented on a central server station in a communication network of a hybrid peer-to-peer type, comprising the steps of:

receiving, from the first client station, a request to validate the collection of digital data, said request containing said collection of digital data, said collection comprising the unique collection identifier and, for each data item belonging to the collection, a data identifier designating said data item, and at least one representation of said data item, the representation being obtained from said data item and said unique collection identifier;

for each received data identifier, locally obtaining a local representation of the data item depending on said data item and on the unique collection identifier of the received collection; and for each data item of the collection, comparing the received representation with the locally obtained representation and, in a case where the comparison results in a match, validating said digital data item in question to be shared, wherein the validating comprises ensuring that said first client station possesses or can rightfully access each data item of the collection.

2. A method according to claim 1, wherein the validation step is followed by a step of calculating a signature of said collection of digital data, in the case of a positive validation of each of the digital data items belonging to the collection.

3. A method according to claim 2, wherein the step of calculating the signature of the collection is followed by a step of sending this signature to the first client station.

4. A method according to claim 1, further comprising a step of local storage of the collection of digital data in response to a positive validation of each digital data item to be shared at the end of the validation step.

5. A method according to claim 1, wherein the step of locally obtaining the representation of the data item associated with the collection comprises the following steps:

a) locally seeking a version of said digital data item;
b) in the case of a positive local search, obtaining a signature of said version of said digital data item; and
c) calculating, by means of a non-reversible function, the representation of said digital data item from the signature and the received collection identifier of said collection.

6. A method according to claim 5, wherein, in the case of a negative local search at the end of the step a), the method further comprises the following steps:

seeking a version of the digital data item identified by a data identifier on the network; and
locally storing said version thus obtained from a client station.

7. A method according to claim 1, further comprising a step of verifying the identifier of the first client station sending the validation request, established by means of a chosen authentication function.

8. A method according to claim 1, wherein, in the case of negative comparison at the step of comparing the representation thus received with the local representation, the following steps are provided:

1) checking whether at least one chosen representation of said data item is in the form of a supplementary collection identifier designating a supplementary collection;
2) obtaining the supplementary collection designated by said supplementary collection identifier, containing at least one representation of said digital data item designated by said data identifier;
3) checking whether said supplementary collection contains a client station identifier corresponding to the client station sending the validation request; and 4) in the case of positive verification at the end of step 3), validating said digital data item to be shared.

9. A method according to claim 8, wherein, in the case of positive verification at the end of the step 3) the method further comprises the steps of:

obtaining a representation of said data item associated with said collection, said step of obtaining comprising:
obtaining a signature of a version of said data item,
calculating by means of a non-reversible function, the representation of said data item from the signature and the collection identifier,
inserting the representation of the data item thus obtained in the collection.

10. A method according to claim 1, further comprising, prior to the receiving step, the following steps relating to the creation of a collection of digital data on the first client station intended to be validated by the server station in the communication network of the hybrid peer-to-peer type:

generating the unique collection identifier designating the collection of digital data to be validated and inserting said collection identifier in a header of the collection;
obtaining the unique data identifiers for each digital data item to be referenced in the collection;
for at least one digital data item, obtaining a signature of a version of the digital data item and calculating the representation of the data item depending on the obtained signature and the collection identifier; and
inserting in the collection the data identifier and the representation of each associated digital data item.

11. A method according to claim 10, wherein, in the case of negative obtaining at the end of the signature obtaining step, provision is made for seeking a collection identifier corresponding to a collection containing the data identifier and the identifier for the client station sending the validation request, and substituting the collection identifier thus found for the representation of said digital data item.

12. A method of checking the integrity of a digital data item forming part of a collection of digital data created by a client station by a) generating a unique collection identifier designating the collection of digital data to be validated and inserting said collection identifier in a header of the collection, b) obtaining a unique data identifier for each digital data item to be referenced in the collection which comprises a list of digital data items to share with one or more other client stations each identified by a unique client station identifier, c) for at least one digital data item, obtaining a signature of a version of the digital data item and calculating a representation of the data item depending on the signature thus obtained and the collection identifier, and d) inserting in the collection the data identifier and the representation of each associated digital data item, the integrity check method being implemented on another client station, in a communication network of the hybrid peer-to-peer type, comprising the steps of:

i) receiving said collection of digital data designated by the unique collection identifier and comprising, for each data item belonging to the collection, the data identifier designating said data item and at least one representation of said data item;
ii) verifying a signature of the collection and, in the case of positive verification;
iii) requesting at least one digital data item from a distant server station previously sought on the network, obtained from said data identifier and said unique collection identifier;
iv) receiving, from the distant server station, said digital data item;

v) locally obtaining a representation of the data item from the digital data item and the unique collection identifier received from the distant server station;

vi) comparing said locally obtained representation of the data item with the representation of the data item in said received collection; and vii) in a case of a positive comparison, validating said digital data item and locally storing the received digital data item, wherein the validating comprises ensuring that said client station possesses or can rightfully access each data item of the collection.

13. A device for validating access rights to a collection of digital data created by a first client station, the collection being designated by a unique collection identifier and comprising a list of digital data items to share with one or more second client stations each identified by a different unique client station identifier, said device being implemented in a central server station belonging to a communication network of a hybrid peer-to-peer type, said device comprising:

receiving means for receiving, from the first client station, a request to validate the collection of digital data, the request containing said collection of digital data, said collection comprising the unique collection identifier and, for each data item belonging to the collection, a data identifier designating said data item, and at least one representation of said data item, the representation being obtained from said data item and said unique collection identifier;

obtaining means that, for each received data identifier, locally obtains a local representation of the data item depending on said data item and on the unique collection identifier of the received collection; and processing means that, for each data item of the collection, compares the received representation with the locally obtained representation and, in a case where the comparison results in a match, validating said digital data item in question to be shared, wherein the validating comprises ensuring that said first client station possesses or can rightfully access each data item of the collection.

14. A non transitory computer readable medium on which is stored a computer program, said program containing instructions that implement the method according to any one of claims 1 to 12, when the program is loaded into and executed by a computer system.

* * * * *